United States Patent [19]

Groya et al.

[11] Patent Number: 4,984,720
[45] Date of Patent: Jan. 15, 1991

[54] SIDE DISPENSING CLOSURE

[75] Inventors: Robert J. Groya, Norridge; Richard W. Hofman, Chicago, both of Ill.

[73] Assignee: Magenta Corporation, Chicago, Ill.

[21] Appl. No.: 317,463

[22] Filed: Mar. 1, 1989

Related U.S. Application Data

[63] Continuation-in-part of Ser. No. 234,568, Aug. 22, 1989, abandoned.

[51] Int. Cl.⁵ ............................................. B67D 5/06
[52] U.S. Cl. .................................... 222/531; 222/153; 222/486; 222/536; 222/556
[58] Field of Search .............. 222/212, 528, 530, 538, 222/544, 556, 564, 565, 153, 484–486, 536, 498, 531; 215/235, 237; 220/254, 239, 337, 339, 344, 351

[56] References Cited

U.S. PATENT DOCUMENTS

| | | | |
|---|---|---|---|
| 2,867,359 | 1/1959 | Adams | 222/485 |
| 3,048,309 | 8/1962 | Albiani | 222/531 |
| 3,057,525 | 10/1962 | Malachick | 222/536 |
| 3,144,180 | 8/1964 | Phillipps | 222/531 |
| 3,266,681 | 8/1966 | Rabb | 222/531 |
| 3,302,835 | 2/1967 | Eckles | 222/531 |
| 3,322,308 | 5/1967 | Foster | 222/498 |
| 3,498,507 | 3/1970 | Seaver | 222/486 |
| 3,499,588 | 3/1970 | Bartilson et al. | 222/565 |
| 3,606,104 | 9/1971 | Rickmeier, Jr. | 222/533 |
| 4,361,250 | 11/1982 | Foster | 222/153 |
| 4,610,371 | 9/1986 | Karkiewicz | 222/153 |
| 4,714,181 | 12/1987 | Kozlowski et al. | 222/556 |

FOREIGN PATENT DOCUMENTS

| | | | |
|---|---|---|---|
| 732473 | 4/1966 | Canada | 222/536 |
| 330741 | 9/1989 | European Pat. Off. | 222/536 |
| 201330 | 12/1958 | Fed. Rep. of Germany | 222/486 |

Primary Examiner—H. Grant Skaggs
Assistant Examiner—Steve Reiss
Attorney, Agent, or Firm—Laff, Whitesel, Conte & Saret

[57] ABSTRACT

A side dispensing container closure cap is provided with a hinged lid portion extending to a side periphery of the cap which is pivotable from a closed position to an opened position and which has depending sidewalls along the length of the pivotable portion forming a chute opened to the periphery of the cap. The sidewalls preferably are formed as conical sections to enhance sealing along the edge of the hinged portion. Detents may be provided at a spherical front surface of the hinged portion defining the dispensing opening allowing partial opening of the pivoted portion. Extra sealing areas are also provided to permit the closure to be used with liquids.

7 Claims, 3 Drawing Sheets

U.S. Patent    Jan. 15, 1991    Sheet 1 of 3    4,984,720
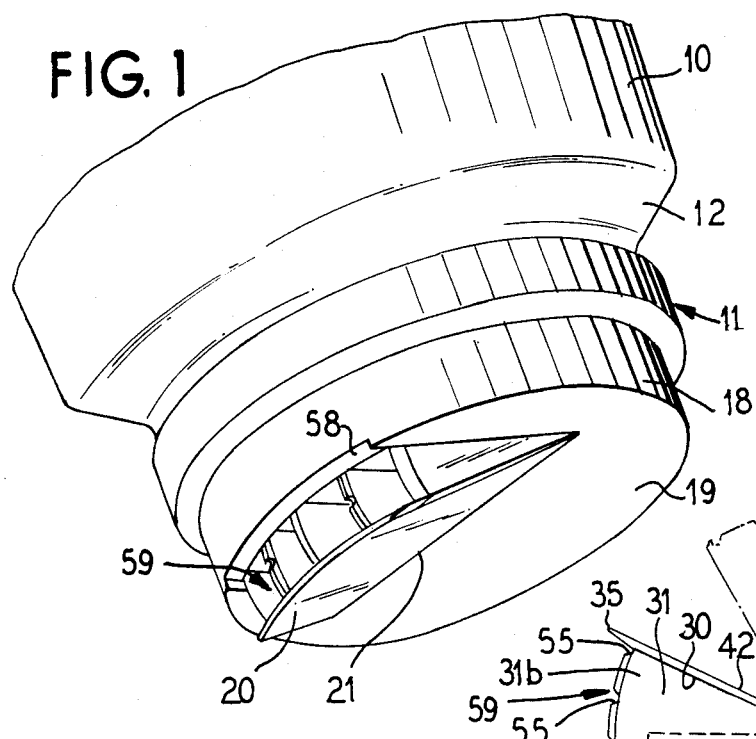
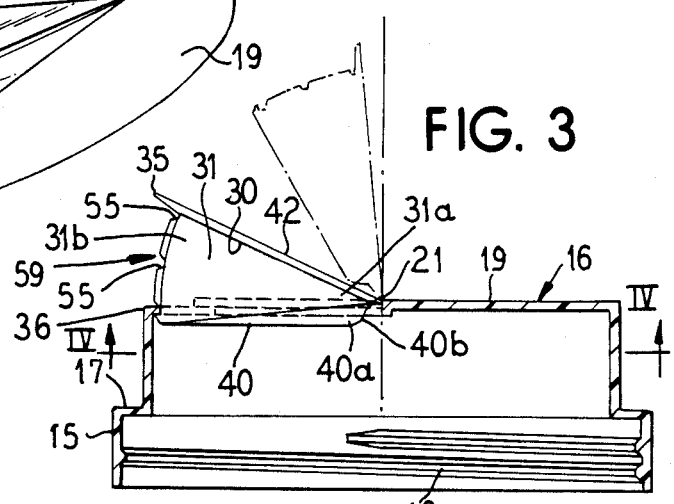
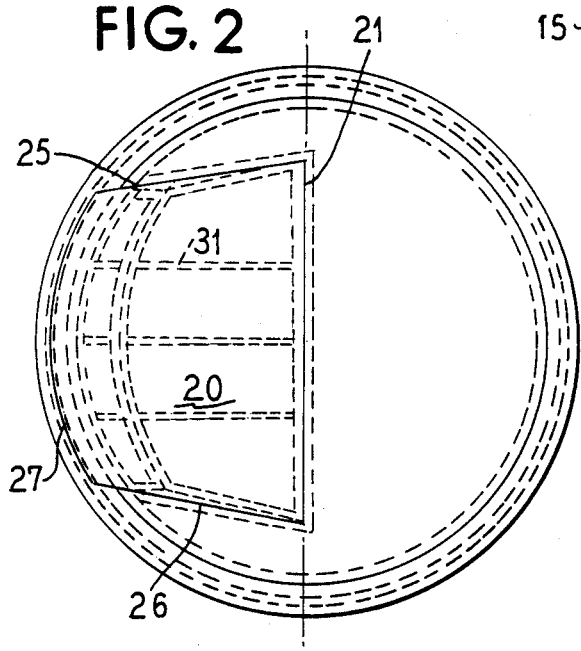
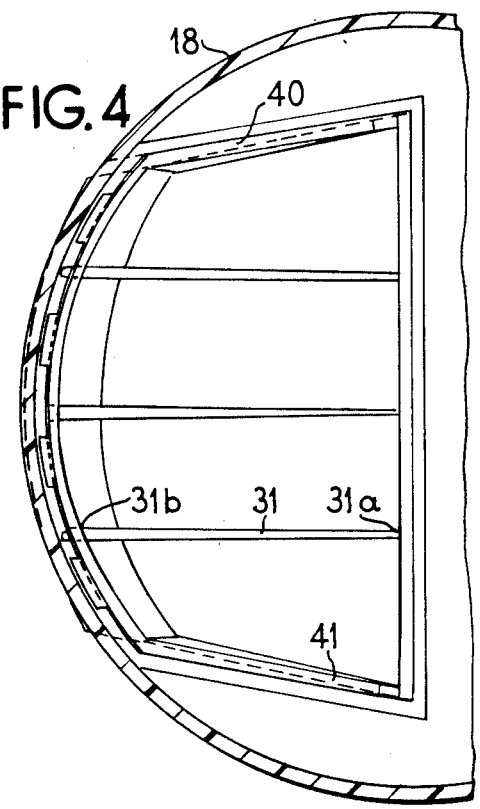

SIDE DISPENSING CLOSURE

RELATED APPLICATIONS

This application is a continuation-in-part of Ser. No. 234,568, filed Aug. 22, 1989, now abandoned.

BACKGROUND OF THE INVENTION

This invention relates to container closures and more particularly to a side dispensing pivoted top container closure.

Containers are normally fitted with closure caps which are frequently molded plastic cap members. Numerous examples exist of such molded closures equipped with dispensing tops including devices where a portion of the end piece or top of the dispensing cap is pivotable from a closed position to an open dispensing position. Such dispensing tops normally provide for contents dispensing in a direction substantially normal to the plane of the end face of the cap. Frequently, however, containers are provided with side dispensing openings, particularly where the container is provided for dry, shakeable ingredients such as, for example, grass seed, salt or the like. Often such side dispensing openings are formed as tear away portions of the container and such tear away portions may include both a portion of a sidewall of the container and a portion of a top wall of the container.

More recently, plastics material containers have been used for packaging such products and it is frequently not desirable to provide tear away portions for such containers, particularly since such a container, once opened, may not thereafter adequately protect the remaining contents from environmental conditions, such as moisture. Equipping such containers with shakeable dispenser caps having top openings requires, however, that the container be held in an inverted position which frequently can be awkward and can result in undesired dispensing patterns and difficulty in achieving proper flow control.

Chute type pivoted dispensers are also known to the art, such as the classic table salt container utilizing a small pivotable (generally metal) chute forming member attached to the top of the container which can be pivoted to define a pouring chute providing a opening between the top of the pivoted member and sidewalls which depend from the top and extend into the interior of the container. Such chute-like dispensers have generally not been adapted for shaking type dispensing nor have they been designed to extend directly to the periphery of the cap.

U.S. Pat. No. 3,144,180 to Phillipps et al discloses a dispensing closure having right angled sidewalls for the chute and a linear front opening, the opening being spaced radially inwardly from a periphery of the closure.

It would therefore be an improvement in the art to provide a hinged top, chute-like dispenser cap adopted for shaking dispensing, particularly for smaller dry or liquid materials.

It would be a further improvement in the art to provide a container cap particularly adopted for molded plastic containers for dry ingredients which cap is capable of side dispensing via a hinged chute-like top portion which opens adjacent the periphery of the cap.

SUMMARY OF THE INVENTION

The present invention provides a molded plastic container closure cap that which includes a skirt portion which may be provided with female threads for attachment to the male threaded neck of a container and a top surface at which, when combined with the skirt forms a cup-like closure. The top has a hinged portion which may be formed with a living hinge and which extends to adjacent the periphery of a hat-like axial projection of the closure. The hinged portion has depending sidewalls which, together with the hinged top section, define a chute dispensing opening open adjacent to periphery. The sidewalls are extended downwardly to a greater degree than those disclosed in the parent application described above to provide for easier closing of the hinged top portion. Further, the sidewalls are formed as a portion of a cone so that the walls continuously press against the top wall opening to provide a greater sealing between the hinged portion sidewalls and the top wall opening. This permits the closure to be used for finely granulated dry materials or even liquid materials. Internal divider ribs may be provided substantially parallel to the sidewalls and the sidewalls or ribs can be equipped with detents to provide for locked open and closed positions. The sidewalls and internal divider ribs have a spherically curved front for continuous sealing against the front wall of the closure. A lip on the top overlies the periphery of the hat-like extension to allow the hinged portion to be opened. A web connecting the sidewalls and the dividers (if any) limits the opening of the chute. Also, a sealing fin is provided inside of the front wall of the closure to provide a seal when the hinged portion is closed.

In this manner a one-piece molded plastic container closure adopted for side shaking dispensing of dry ingredients as well as liquid ingredients is provided which has a chute-like hinged dispensing orifice aligned substantially at the periphery of the closure so as to facilitate side shaking dispensing of the ingredients contained within the container. If desired, one or more of the sidewalls or dividers may be provided with beads or ribs which can index with portions of the container periphery, or with an inturned lip thereat, to facilitate retaining the dispensing opening in various open or closed positions.

It is therefore a principal object of this invention to provide an improved side dispensing container closure.

It is another and more particular object of this invention to provide a side dispensing container closure molded of plastic with a hinged top portion which defines a chute-like dispensing chamber with an orifice located adjacent the periphery.

It is a specific object of this invention to provide an improved container closure adopted for side shaking dispensing of container contents through a dispensing opening formed adjacent a peripheral edge by a chute-like hinged portion of the top of the container which is integrally formed through a living hinge with the remainder of the container top and which includes sidewalls and internal dividers and having projections which interfit with other portions of the top to retain the hinged portions selectively opened or closed.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a fragmentary prospective view of a container equipped with closure cap of this invention with the dispensing orifice open.

FIG. 2 is a top plan view of the closure cap of FIG. 1.

FIG. 3 is a cross-sectional view taken along the lines of III—III of FIG. 2.

FIG. 4 is a cross-sectional view taken along the lines of IV—IV of FIG. 3.

DESCRIPTION OF THE PREFERRED EMBODIMENTS

Figure 5:
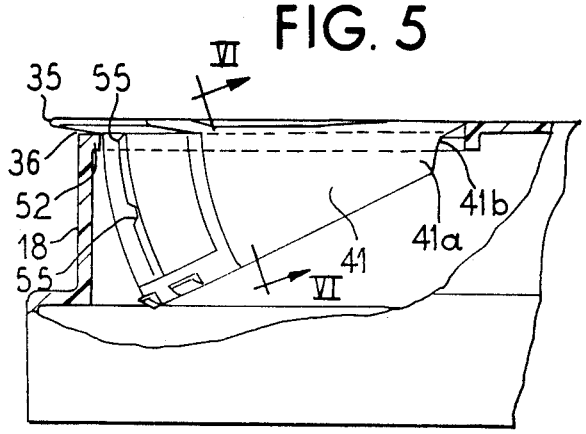
FIG. 5 is a side view with portions broken away to show underlying portions of a container closure cap of FIG. 1.

FIG. 1 illustrates a container 10 equipped with a closure 11. The particular shape of the container has no importance to this invention except that it is equipped with an open ended throat 12 which may have a means for affixing a closure to the container formed thereon. In the further discussion of the preferred embodiment the fixing means is shown as including female threads 13 on the closure which would index with male threads on the neck of the container. Alternatively other types of fasteners may be used such as a snap-on bead fastener or the like. The type of container sought to be illustrated is a dry goods or liquids container generally molded of plastic which has recently become popular for ingredients designed to be shaken such as grass seed, road salt, fertilizer and the like as well as finer materials such as spices, powders, and even liquids such as syrups, oils and shampoos.

The closure is illustrated in FIGS. 1-3 as having a depending peripheral skirt 15 on which the internal threads 13 are formed. The top 16 is formed as a generally hat-like extension extending upwardly from the skirt but positioned inwardly therefrom spaced from the periphery of the skirt by a ledge section 17. The ledge section may overlie the rim of the container. The hat-like extension includes a peripheral wall portion 18 and a top portion 19. Such hat-like closures are common in the industry. The closure, including the skirt 15, the ledge 17, the periphery 18 and the top 19 is circular although if desired other shapes, except for the skirt 15, could be employed as will be apparent to those skilled in the art.

The top 19 is provided with a hinged portion 20 which is connected to the remaining portions of the top through a living hinge connection 21 which extends chordally of the top and is positioned such that the hinged portion occupies a substantial portion of the area of the top. When the periphery 18 is circular, as in the preferred embodiment illustrated, the hinge connection is located at the diameter of the top 19 so that all generated curves, as will be described in greater detail below, can be generated with the hinge connection as the centerpoint. As illustrated, the hinged portion fits in an opening in the top 19 which extends from the hinge to the periphery and is defined by converging sidewalls 25 and 26 which, however, at the dispensing periphery 27 are spaced apart a considerable distance. The hinged portion 20 is provided in the manner of a flap or leaf which is attached only at the living hinge 21.

An undersurface 30 of the hinged portion is provided with a plurality of parallel ribs 31 which, in the preferred embodiment are parallel to each other but at a slight angle to the converging sidewalls 25,26. The ribs may be of varying height such that, as illustrated in FIG. 3, each rib 31 has a short end 31a near the hinge connection 21 and a taller forward end 31b adjacent the dispensing periphery of the hinged flap portion 20 opening. The ribs 31 terminate short of a foremost projection 35 of the hinged portion 20 which foremost projection 35 overlies and extends significantly beyond a peripheral top 36 of the periphery 18 to form an opening lip (FIG. 5).

Sidewalls 40 and 41 extend downwardly from the top surface 42 of the hinged portion at the sidewalls 25 and 26. Both the sidewalls 40 and 41 and the ribs 30 are wedge-shaped such that they project below the undersurface 30 to a greater extent adjacent the dispensing peripheral opening 27 and decrease in height towards the living hinge portion 21. The sidewalls 40 and 41 have a lesser angle of wedge inclination than the ribs 31, which angle of inclination would normally cause the sidewalls to extend rearwardly beyond the hinge. Thus near a rear terminal end 40a, 41a of the sidewalls there is a recessed portion 40b, 41b which angles rapidly toward the undersurface 30 of the hinged portion 20. When the hinged portion is in a normal full open position, as shown in FIG. 3, the bottom edge of the sidewalls is substantially parallel to and below the undersurface 30 of the hinged portion 20. In this manner, the sidewalls 40,41 will always remain captured in the opening in the top 19 so that closing of the hinged portion will be easy to accomplish.

Figure 6:
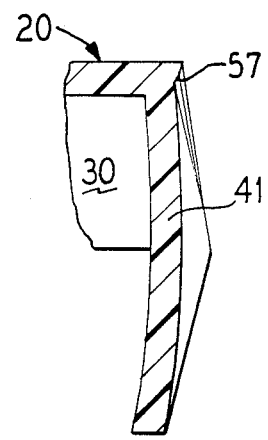
FIG. 6 is an enlarged fragmentary sectional view taken from the front of the container closure of a sidewall of the hinged portion substantially along the lines of VI—VI of FIG. 5.
Figure 7:
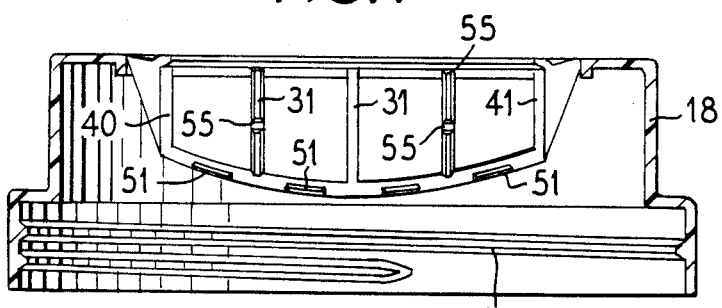
FIG. 7 is a cross-sectional view taken substantially along the lines of VII—VII of FIG. 5.

The sidewalls 40,41 are formed as sections of a cone, as best seen in FIG. 6, such that the walls 40,41 are bowed outwardly slightly along a height of the walls to maintain the outer surface of the walls in tight sealing contact with the opening sidewalls 25,26 in the top wall 19 of the closure as the hinged portion 20 moves between an open and closed position. As best illustrated in FIG. 7 the ribs 31 and sidewalls 40 and 41 are all interconnected at the dispensing end of the hinged flap section 20 at their bottoms by a web member 50. The web member 50 has a projecting latch portion 51 which is designed to underlie an inturned lip portion 52 at the top 36 of the periphery 18 to form a catch which limit opening of the hinge portion. Additionally, one or more of the ribs 31 may be provided with detents 55 which are dimensioned to engage with the inturned lip 52 as the hinged portion 20 is moved towards a wider or narrower opening. In this manner a plurality of opened positions can be provided allowing the hinged top to be snapped into greater and lesser opened positions. In the most fully closed position the topmost of the detents 55 cooperates with the opposed surface of the lip 52 to maintain the dispensing flap 20 closed.

As illustrated in phantom in FIG. 3, the closure of this invention may be formed in a single molding most expeditiously by molding the hinged portion elevated out of the opening in the top 19 into which it is to fit. Thereafter by forcing the web latch 51 which may be formed with a series of spaced ribs best shown in FIG. 7, past the inturned lip 52, the pivoted flap section 20 can then be inserted into operable position in the remainder of the closure cap. It will be appreciated that this forcing can occur because the cap will be formed of a rigid but partially yieldable plastics material. Further, the hinged portion 20 may also be reopened to the phantom position of FIG. 3 by forcing the latch 50 past the inturned lip 52, for example, to provide greater access to the interior of the container for a utensil such as a spoon.

It will be seen that by forming the inturned lip 52 of relatively small dimensions extending directly inwardly from the periphery 18 that the actual dispensing opening 59 will lie substantially at the periphery of the hat-like top. Again, by maintaining the ledge 17 relatively small, or even nonexistent, the actual dispensing will occur at the periphery. Moreover it will be appreciated that the hinged portion 20 when in an open position defines a chute which has a bottom surface formed as the undersurface 30, sidewalls defined by the sidewalls 40 and 41 and internal chute dividers defined by the ribs 31. This chute-like dispensing, particularly when coupled with the variable opening settings provided by the detents 55 allows very effective dispensing of dry or granular material from the container. However, when the flap is closed, it is held in a secure closed position by the detents 55 to insure against accidental spillage and to act as a protective closure cap for the contents. By properly sizing the position of the sidewalls 40 and 41, little or no gap will exist between a downturned lip 58 formed along sidewalls 25,26 and the sidewalls 40,41 of the hinged portion 20. If desired, the actual flap top can extend slightly beyond the sidewalls 40,41 (as at 57 in FIG. 6) to facilitate the seal. It will be appreciated that the skirt portion 18 is recessed at the top at the portion overlaid by the lip 35 as illustrated at 58 in FIG. 1.

Figure 9:
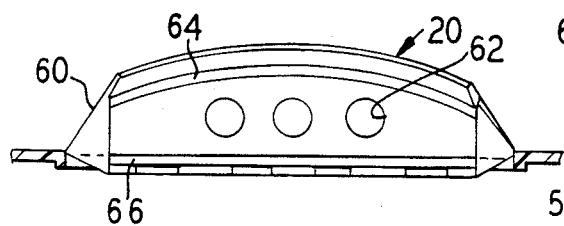
FIG. 9 is a front elevational view of the closure of FIG. 8.
Figure 8:
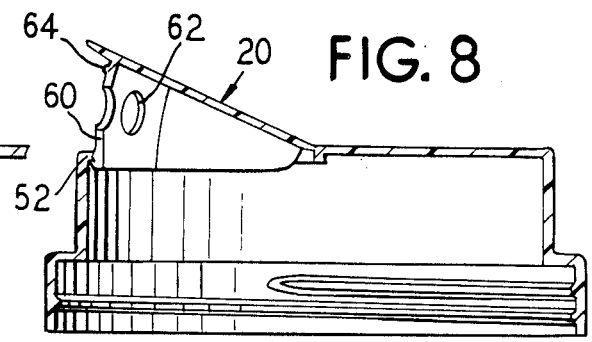
FIG. 8 is a cross-sectional view of an alternative embodiment of the closure taken substantially as that of FIG. 3.
Figure 10:
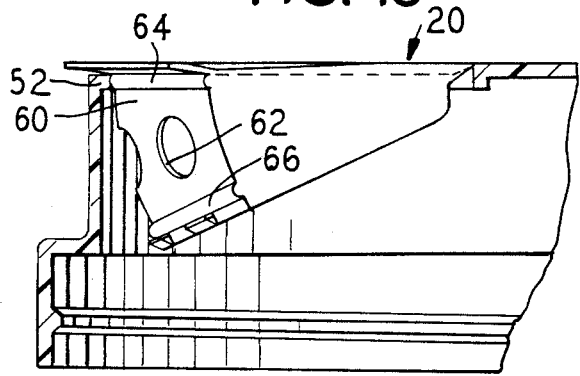
FIG. 10 is a side view with portions broken away to show underlying portions of a container closure cap of FIG. 8.

A first alternative embodiment of the invention is illustrated in FIGS. 8-10 wherein the ribs 31 described above have been removed and a front compound curved (spherical) panel or web 60 is provided which has a plurality of large openings 62 therein to permit the dispensing of the materials contained in the container. An upper 64 and lower 66 sealing bead is provided to assure that sealing is complete when the lid 20 is either in the full open (FIGS. 8 and 9) or full closed (FIG. 10) positions. The sealing beads engage with the inturned lip 52 of the lid. In all other respects, the closure lid can be identical to that described above.

Figure 11:
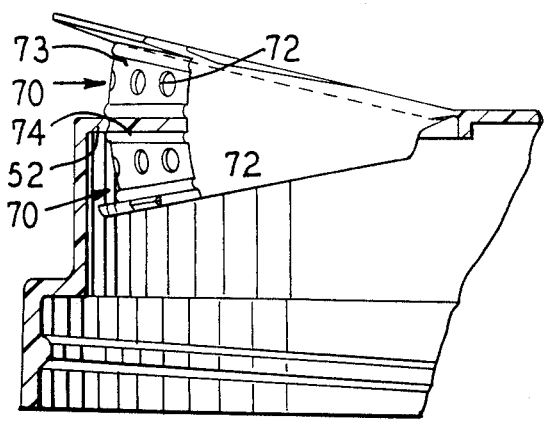
FIG. 11 is a side sectional view with portions broken away of an alternative embodiment of the closure.
Figure 13:
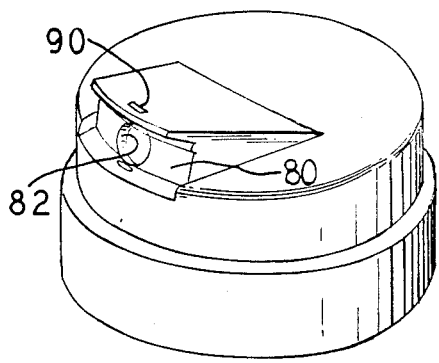
FIG. 13 is a perspective view of the closure embodiment of FIG. 12.
Figure 12:
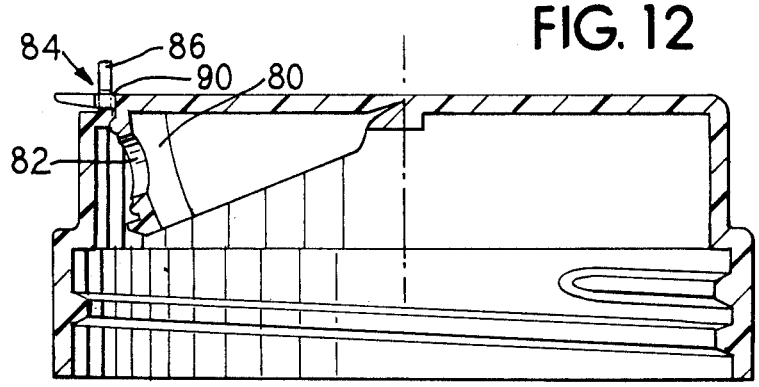
FIG. 12 is a side sectional view of an alternative embodiment of the closure and including a tamper indicator.
Figure 14:
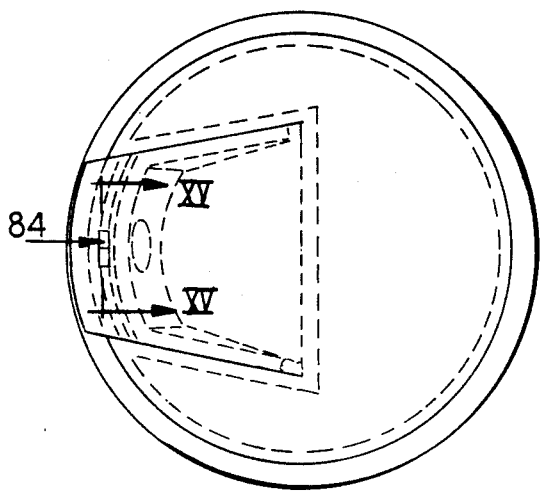
FIG. 14 is a top elevational view of the closure embodiment of FIGS. 12 and 13.
Figure 15:
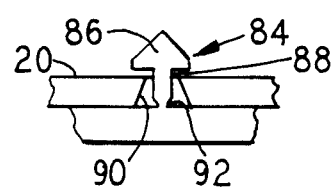
FIG. 15 is a fragmentary sectional view of the tamper indicator of FIG. 12.

A second alternative embodiment of the invention is shown in FIG. 11, wherein a plurality of rows 70 of smaller openings 72 are provided in a front compound curved (spherical) panel or web 73 with a detent 74 formed between the individual rows to permit a secure selection of a specific number of opening rows to be exposed for dispensing. The detent 74 engages with the internal lip 52 of the lid. In all other respects, the closure can be identical to that shown and described in FIGS. 8-10.

FIGS. 12-15 illustrate yet another alternative embodiment of the present invention wherein a front compound curved (spherical) wall or web 80 of the dispenser has a single opening 82 therein. Also a tamper indicator 84 is included, the tamper indicator being a wedge shaped projection 86 having a lower recessed area 88 which cooperates with an opening 90 in the top flap 20. When the closure is formed, the projection 86 and the opening 90 are separated. When the flap is closed for the first time, the wedge 86 will be inserted into the opening 90 and will be captured by the lid 20. The first time that the flap 20 is then opened, a weakened portion 92 of the projection 86 will separate causing the wedge 86 to detach from the container lid providing a visual indication that the lid has been opened.

In each of the embodiments described above, front edges of the sidewalls 40,41 are curved, having a centerpoint of the curve being along the hinge connection 21. The ribs 31, if any, and the webs 60,73,80 are also curved about the hinge connection 21. Further, if the peripheral wall portion 18 is circular, then the web would be spherically shaped. However, if the peripheral wall portion 18 is rectangular, the web would only be curved in the vertical direction and would be linear in the horizontal direction.

It will therefore be seen from the above that this invention provides an improved side dispensing container closure cap having a hinged flap dispenser which provides a chute-like dispensing opening.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim as our invention:

1. An annular molded plastic container closure cap comprising a peripheral annular skirt having internal means formed thereon for fixing the closure cap to a container and an annular top closing one end of the skirt, a hinged top portion being joined to the top at a hinge connection remote from a periphery of the top being pivotable from a closed position to an open position to open and close an opening formed in said top adjacent periphery of said top, said hinged top portion terminating at the periphery of said top at a dispensing opening, sidewalls for hinged top portion depending from an undersurface of said hinged top portion, said side walls being formed as a conical section and being bowed outwardly to maintain an outer surface of said walls in tight sealing contact with an opening sidewall in a top wall of the closure as said hinged portion moves between an open and closed position, a solid panel interconnecting said sidewalls at a forward end of said sidewalls remote from said hinge connection and adjacent said periphery, said panel having means thereon cooperating with a lip extending inwardly of the periphery of said top to limit opening of said hinged top portion, and said panel having at least one opening therethrough for dispensing material contained in said container.

2. The closure of claim 1 wherein said panel has a plurality of openings therethrough arranged in at least one row.

3. The closure of claim 2 wherein said opening are formed in a plurality of horizontal rows.

4. The closure of claim 3 wherein a detent is formed between horizontal rows to permit selected retention of the closure lid in various degrees of opening to expose selected numbers of rows of openings for dispensing.

5. The closure of claim 1 wherein seal means are provided along a top horizontal edge and a bottom horizontal edge of said panel to engage with said lip.

6. The closure of claim 1, further comprising a tamper indicating means having a detachable projection formed on said closure and engageable with said hinged top portion to cause said projection to become detached when said hinged top portion is first opened from a closed position.

7. An annular molded plastic container closure cap comprising a peripheral annular skirt having internal means formed thereon for fixing the closure cap to a container and a circular top closing one end of the skirt, a hinged top portion being joined to the top at a hinge connection remote from a periphery of the top, said hinged top portion being pivotable from a closed position to an open position to open and close an opening formed in said top with said opening extending to the periphery of said top, said hinged top portion terminating at a circular periphery of said top at a dispensing opening, sidewalls for said portion depending from an undersurface of said hinged top portion, said sidewalls being formed as a conical section and being bowed outwardly to maintain an outer surface of said sidewalls in tight sealing contact with an opening sidewall in a top wall of the closure as said hinged portion moves between an open and closed position, and said undersurface and said sidewalls defining a chute-like dispensing orifice when said portion is pivoted to an open position, said sidewalls interconnected by a solid panel at a forward end of said sidewalls remote from said hinge connection, said panel having means thereon projecting forwardly of said sidewalls and cooperating with a lip extending inwardly of the periphery of said top to limit opening of said hinged top portion.

* * * * *